No. 701,568. Patented June 3, 1902.
J. D. HODGES.
CAR FENDER.
(Application filed Nov. 19, 1901.)

(No Model.)

Witnesses
Alfred A. Eicker
John M. Rippey

Inventor
John D. Hodges
by Higdon & Longan Attys.

THE NORRIS PETERS CO., PHOTO-LITHO., WASHINGTON, D. C.

UNITED STATES PATENT OFFICE.

JOHN D. HODGES, OF ST. LOUIS, MISSOURI, ASSIGNOR OF TWO-THIRDS TO DON W. HEWITT AND EDWARD BUTLER, JR., OF ST. LOUIS, MISSOURI.

CAR-FENDER.

SPECIFICATION forming part of Letters Patent No. 701,568, dated June 3, 1902.

Application filed November 19, 1901. Serial No. 82,942. (No model.)

*To all whom it may concern:*

Be it known that I, JOHN D. HODGES, of the city of St. Louis, State of Missouri, have invented certain new and useful Improvements in Car-Fenders, of which the following is a full, clear, and exact description, reference being had to the accompanying drawings, forming a part hereof.

This invention relates to car-fenders; and it consists of the novel construction, combination, and arrangement of parts hereinafter shown, described, and claimed.

Figure 1:
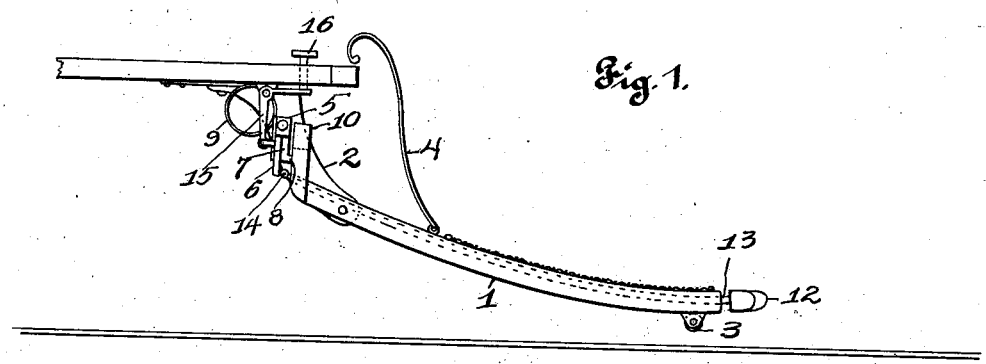
Figure 2:
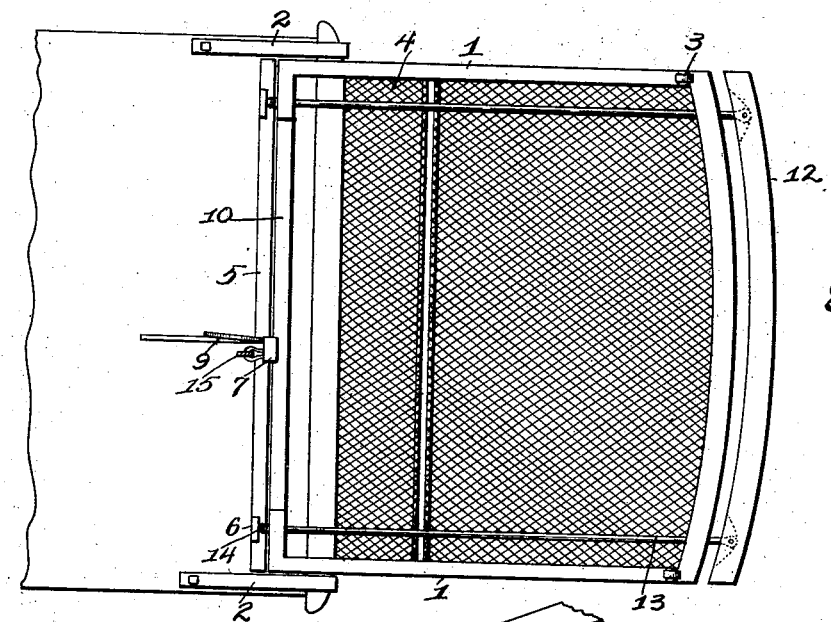
Figure 3:
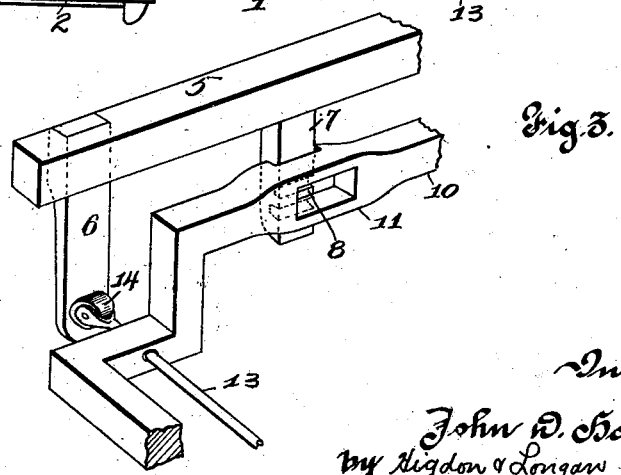

Figure 1 is a view showing my improved car-fender in its normal position. Fig. 2 is a view showing the under side of the fender and the connections which support it to the car. Fig. 3 is a perspective view showing the devices by which the fender is held in different positions.

My improved fender consists of the frame 1, which is pivotally supported by the brackets 2, connected to the under side of the car. The said fender normally extends forwardly on an incline and is provided on its forward end with the rollers 3, which are adapted to operate upon the track when the fender is lowered thereon. The frame 1 is covered by any suitable material to uphold the objects which are encountered by the fender, and near the rear end of the fender is hinged a shield 4, which extends upwardly and rests against the forward end of the car, and the object thereof is to prevent the bodies which are raised by the fender from striking against the end of the car-body.

5 indicates a cross-piece or other similar device which is supported between the brackets 2 and carries near each end an arm 6 and is provided near its center with another arm 7, which extends downwardly and has formed on its forward side a number of teeth 8. The said arms are actuated forwardly by means of a spring 9, secured to the under side of the car and bearing against the central arm 7. The rear end of the fender carries a cross-piece 10, which is provided with an enlarged portion 11 adjacent to the vertical arm 7, and the said portion 11 is in the form of an arc, the rear edges of which are intended to engage with the teeth 8, and thereby hold the fender in different positions determined by the adjustment of the piece 10 relative to the said teeth 8. By lowering the rear end of the fender and engaging the portion 11 with the lowermost teeth on the arm 7 the forward end of the fender will be upheld, which is its normal position, as shown in Fig. 1.

I have provided an automatic trip whereby the fender will be released and permitted to drop to the track whenever any object is encountered by the forward end thereof. The said trip consists of the cross-piece 12, carried in front of the fender by the rods 13, which extend from the forward end of the fender parallel to the sides of the fender-frame and carrying rollers 14 on their rear ends which bear against the vertical arms 6. The said cross-piece 12, as is clearly shown in Fig. 2, is a slight distance in front of the forward end of the fender, and hence may be pressed rearwardly whenever any object is encountered thereby, and when so operated the rods 13 are also moved, which presses the arms 6 and the central arm 7 rearwardly, releasing the teeth 8 from the arm 11 and allowing the forward end of the fender to drop to the track, the rollers 3 operating upon the rails. I have also provided means whereby the fender may be released by the motorman, and the said operating device consists of the bell-crank 15, pivoted under the car and having one arm connected to the cross-piece 5 and the other arm extending horizontally under the car-floor. A pin 16 is removably supported within the opening formed in the car-floor, and the lower end of the said pin rests upon the horizontal arm of the bell-crank, and when the said pin is pressed downwardly the bell-crank will be operated to drop the part 5, and thereby disengage the teeth 8 from the frame 11, allowing the fender to drop to the track.

I claim—

1. A car-fender, consisting of a frame pivotally supported under the car, a cross-piece 5 supported adjacent the rear end of the fender, means carried by said cross-piece for holding the fender in an elevated position, and means for automatically releasing the fender from the said cross-piece whenever any object is engaged by the forward end of the fender, substantially as specified.

2. A fender, consisting of a frame pivotally supported under the car, a cross-piece 5 supported adjacent to the rear end of the fender, means carried by said cross-piece for engaging the fender to hold it in different positions, rods extending within the fender-frame and projecting in front of the fender, a cross-piece carried by said rods and adapted to first engage any object which may be on the track so that the said rods will be forced rearwardly, means whereby the first-mentioned cross-piece will be operated whenever the said rods are moved and the fender released, and a shield hinged to the said fender and extending upwardly in front of the end of the car, substantially as specified.

3. A car-fender, consisting of a frame pivotally supported by the car, a cross-piece 5 supported under the car, an arm 7 carried by said cross-piece 5 and adapted to engage with the rear end of the fender to hold it in different positions, arms 6 carried by the ends of the cross-piece 5 and extending downwardly, rods 13 supported within the fender-frame and projecting in front thereof, a member 12 carried by said rods 13 in front of the fender, the rear ends of the said rods 13 bearing against the arms 6 so that the said arms will be moved to release the fender whenever any object is encountered by the said member 12, means for holding the arm 7 in contact with the end of the fender, and a suitable shield carried by the fender and extending upwardly in front of the car, substantially as specified.

In testimony whereof I affix my signature in presence of two witnesses.

JOHN D. HODGES.

Witnesses:
 ALFRED A. EICKS,
 FRANK TURNER.